United States Patent [19]
Shimizu

[11] Patent Number: 5,667,812
[45] Date of Patent: Sep. 16, 1997

[54] TIRE VULCANIZING MOLD

[75] Inventor: Keiji Shimizu, Akashi, Japan

[73] Assignee: Sumitomo Rubber Industries, Ltd., Hyogo-ken, Japan

[21] Appl. No.: 658,670

[22] Filed: Jun. 4, 1996

[30]       Foreign Application Priority Data

Jun. 5, 1995   [JP]   Japan ................................. 7-138149

[51] Int. Cl.[6] ............................................... B29C 35/02
[52] U.S. Cl. ................................ 425/46; 425/35; 425/47
[58] Field of Search ............................ 425/28.1, 35, 46, 425/47

[56]                References Cited

U.S. PATENT DOCUMENTS 3,704,082  11/1972  Hottle ........................................ 425/46
3,989,791  11/1976  Tippin ....................................... 425/46
4,035,119   7/1977  Beres et al. ............................... 425/46
5,190,767   3/1993  Beres et al. ............................... 425/46

*Primary Examiner*—James P. Mackey
*Attorney, Agent, or Firm*—Birch, Stewart, Kolasch & Birch, LLP

[57]                    ABSTRACT

A tire vulcanizing mold is divided into an upper-mold and a lower-mold in the tire axial direction. The upper and the lower molds have a base part with a molding surface for a tire-bead and a tire-sidewall, and a tread ring part with a molding surface for a tire-tread and a tire-buttress. The tread ring part is divided by radial split surfaces into a plurality of tread segments supported on the base part tiltably around a center line in the tangential direction of a circle centered on the tire axis between the reference position, where the radial split surfaces of the tread ring part contact to each other, and a releasing position, where the radial split surfaces are separated to each other.

4 Claims, 11 Drawing Sheets

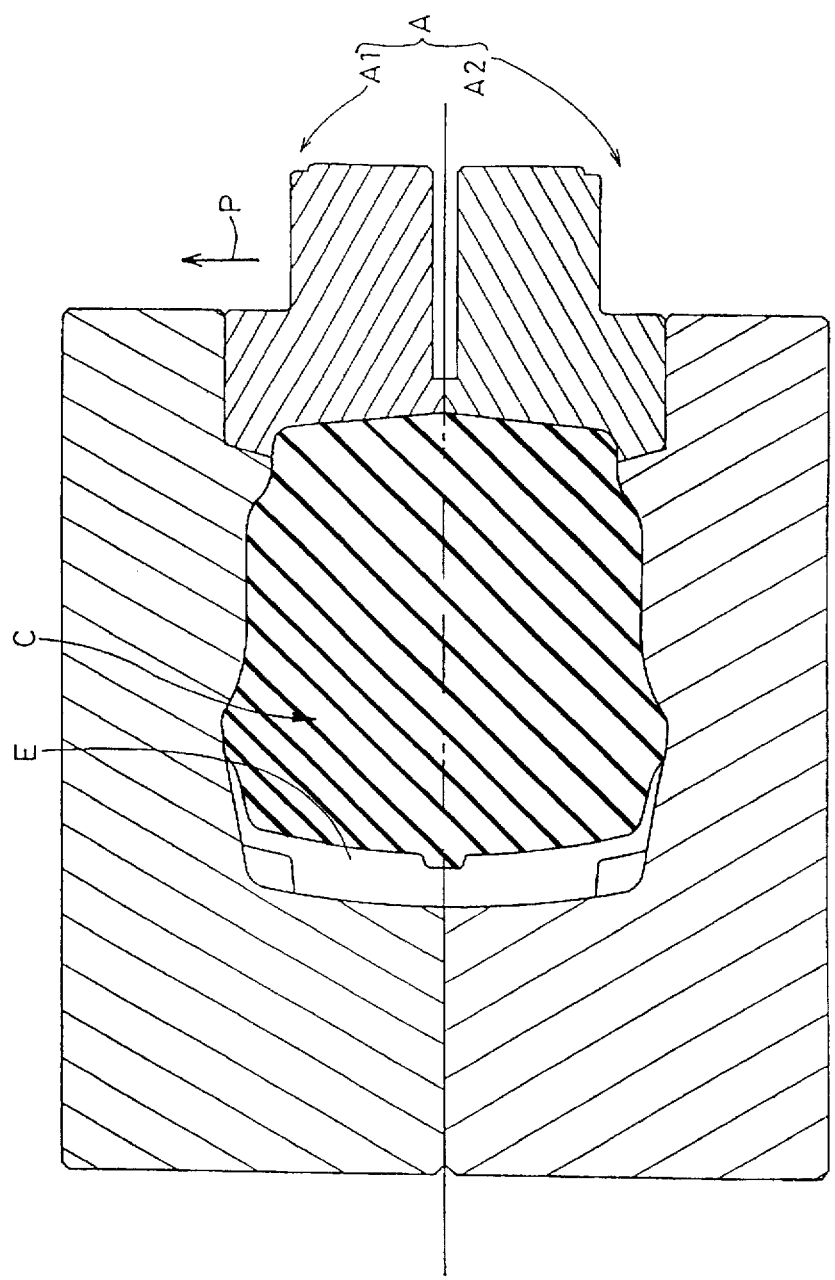
FIG. 11 CONVENTIONAL

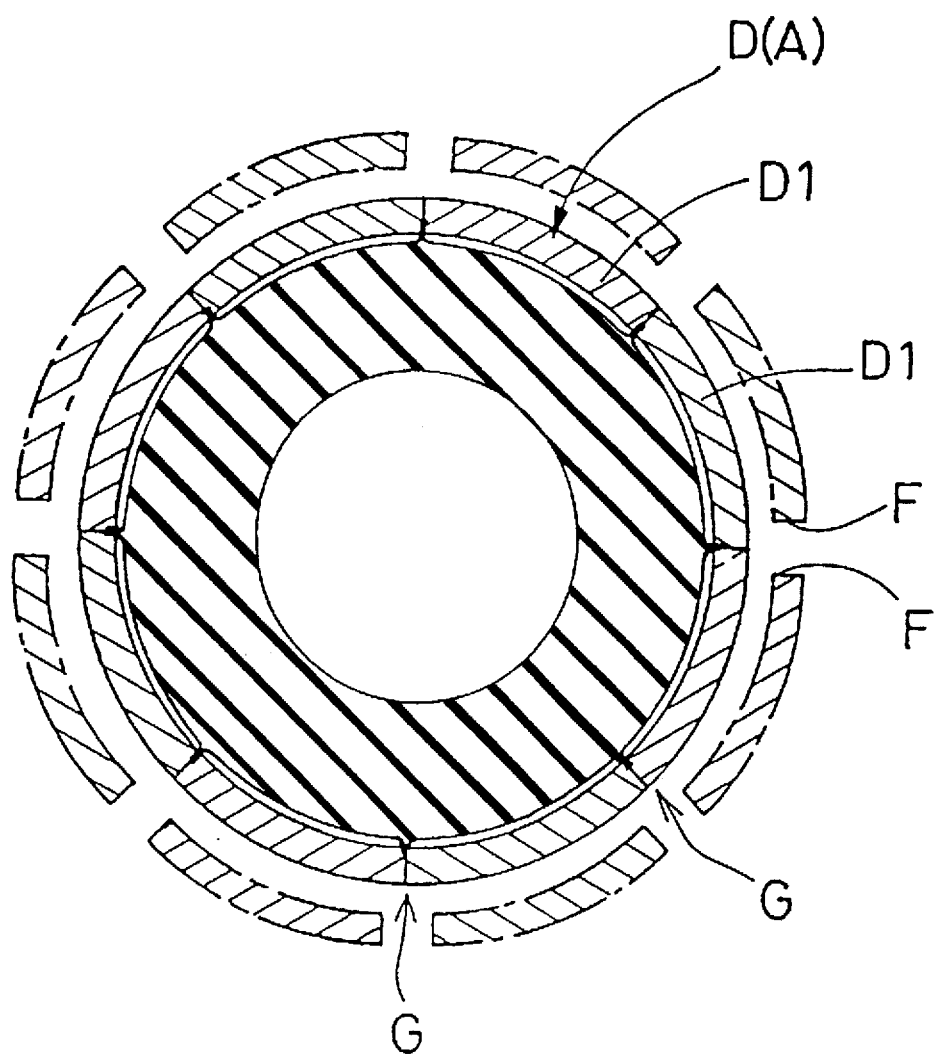
FIG. 12
CONVENTIONAL 5,667,812

1

TIRE VULCANIZING MOLD

BACKGROUND OF THE INVENTION

The present invention relates to a tire vulcanizing mold capable of easily taking out a finished tire without causing rubber defect or the like, enhancing the appearance of the finished tire, and manufacturing at low cost, so as to be preferably used in vulcanizing solid tires, in particular.

FIELD OF THE INVENTION

For example, a solid tire having a same appearance and shape as a pneumatic tire is preferably used in forklifts or the like. Such the solid tire is manufactured hitherto, as shown in FIG. 11, by charging a roughly shaped green tire into a space C of a two piece mold A consisting of an upper and a lower molds A1, A2, and vulcanizing the green tire in the mold A. And the vulcanized solid tire is taken out from the space C by opening the upper and the lower molds A1, A2 in the tire axial direction P.

In the two piece mold A, however, since rib portions E of the mold A, for forming a tire-tread pattern, buried in a tire-rubber is drawn out in the tire axial direction when the tire is taken out, the resistance between the tire and the mold tends to be higher. As the result, it is not easy to take out the tire, and tire rubber are likely to be chipped by drawing the rib portions E in the tire axial direction so that the appearance of the finished tire is spoiled.

As means for solving such problems, for example, as shown in FIG. 12, it is proposed that a ring part D of the mold A for molding the tire-tread is divided into eight or nine tread segments D1 by split surfaces F extending in the tire radial direction, and that the segments D1 are guided in the tire radial direction so as to expand the ring part D in the diameter. Accordingly, the rib portions are drawn out in the tire radial direction, then the resistance between the finished tire and the mold A becomes lower.

However, such split mold is complicated in structure and working mechanism for moving the segments D1 in the radial direction, and requires a very expensive apparatus. In addition, since the ring part D is contracted in diameter while squeezing the green tire, much rubber oozes out from gaps G between the split surfaces F, the appearance of the finished tire is often spoiled, and the above problems are not solved completely.

SUMMARY OF THE INVENTION

It is hence a primary object of the invention to present a tire vulcanizing mold capable of reducing the resistance between the mold and the finished tire, preventing rubber defects and other appearance defects, and manufacturing at low cost by a simple mechanism.

According to one aspect of the present invention, a tire vulcanizing mold which is divided into an upper mold and a lower mold in the tire axial direction by a split surface, each of said upper mold and the lower mold comprising a base part having a bead molding surface for a tire-bead and a sidewall molding surface for a tire-sidewall, and a tread ring part having a tread molding surface for a tire-tread and a buttress molding surface for a tire-buttress, wherein said tread ring part is divided into a plurality of tread segments by radial split surfaces extending from the tire axis in the tire radial direction, each of said tread segments has a stop surface contacting with the base part at a reference position where the radial split surfaces of the tread ring part contact to each other, and

2 is supported on the base part tiltably around a center line in the tangential direction of a circle centered on the tire axis between the reference position and a releasing position where the radial split surfaces are separated to each other, and a radial distance from the tire axis to the tread molding surface at the releasing position is larger than a radial distance from the tire axis to the tread molding surface at the reference position.

The tread segments are preferred to be thrust toward the reference position by spring means.

Moreover, the tread segments are preferred to have a stop surface contacting with the base part at the releasing position, and a minimum radial distance from the tire axis to the buttress; molding surface at the releasing position is preferred to be smaller than a radial distance from the tire axis to a radially outer surface of a green tire.

BRIEF DESCRIPTION OF THE DRAWINGS

An embodiment of the present invention will now be described, by way of example, referring to the attached diagrammatic drawings, in which:

FIG. 11 is a sectional view for explaining a conventional vulcanizing mold.

FIG. 12 is a sectional view for explaining other conventional vulcanizing mold.

DETAILED DESCRIPTION OF THE INVENTION

Figure 1:
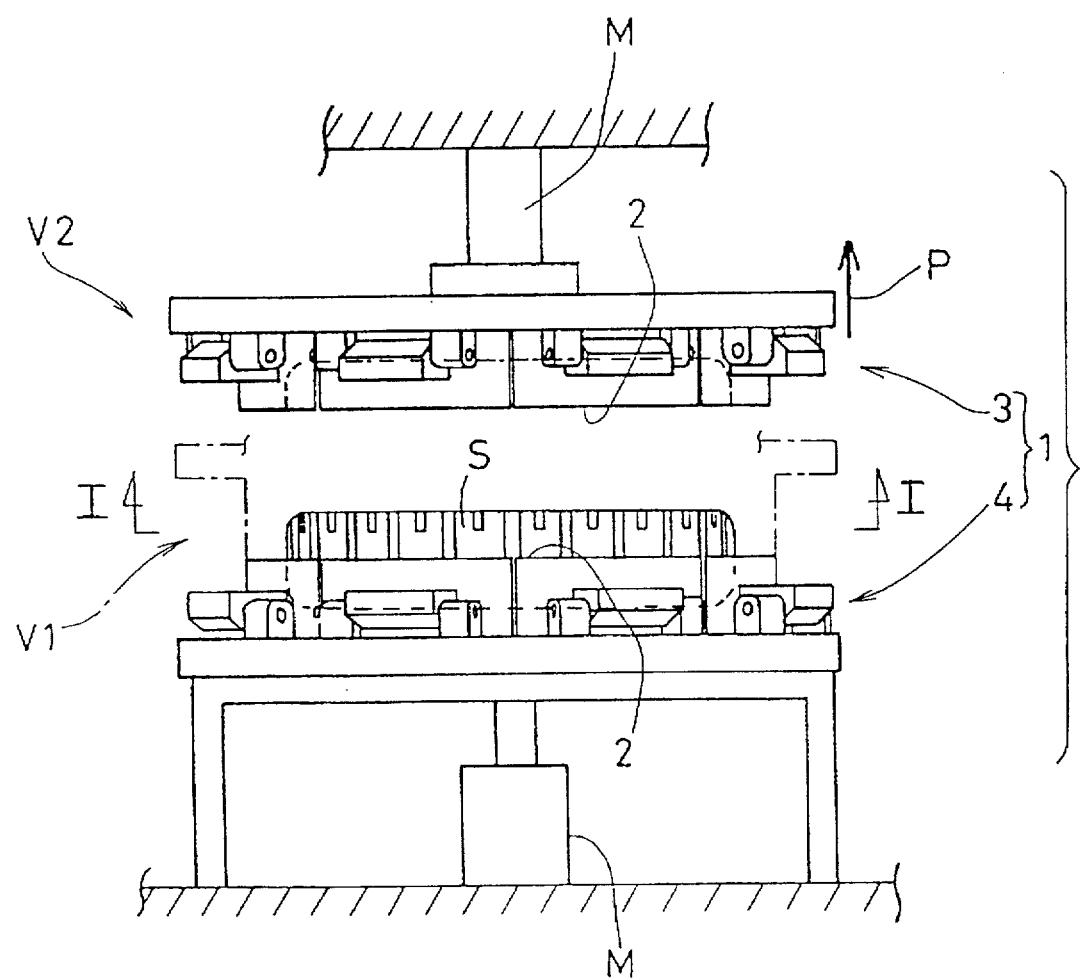
FIG. 1 is a side view showing an example of working condition of an embodiment of the invention.

A tire vulcanizing mold 1 comprises, as shown in FIG. 1, an upper mold 8 and a lower mold 4 supported detachably to each other at a split surface 2 in the tire axial direction P from a contact state V1, where the split surfaces 2, 2 contact to each other so as to close a space 15 for molding a solid tire S, to a separate state V2, where the split surfaces 2, 2 are detached to each other so as to open the space 15. In this embodiment, the split surfaces 2 are positioned approximately on the tire equator.

Either one or both of the molds 3 and 4 are mounted on a lift M so as to contact with or depart from each other.

Figure 2:
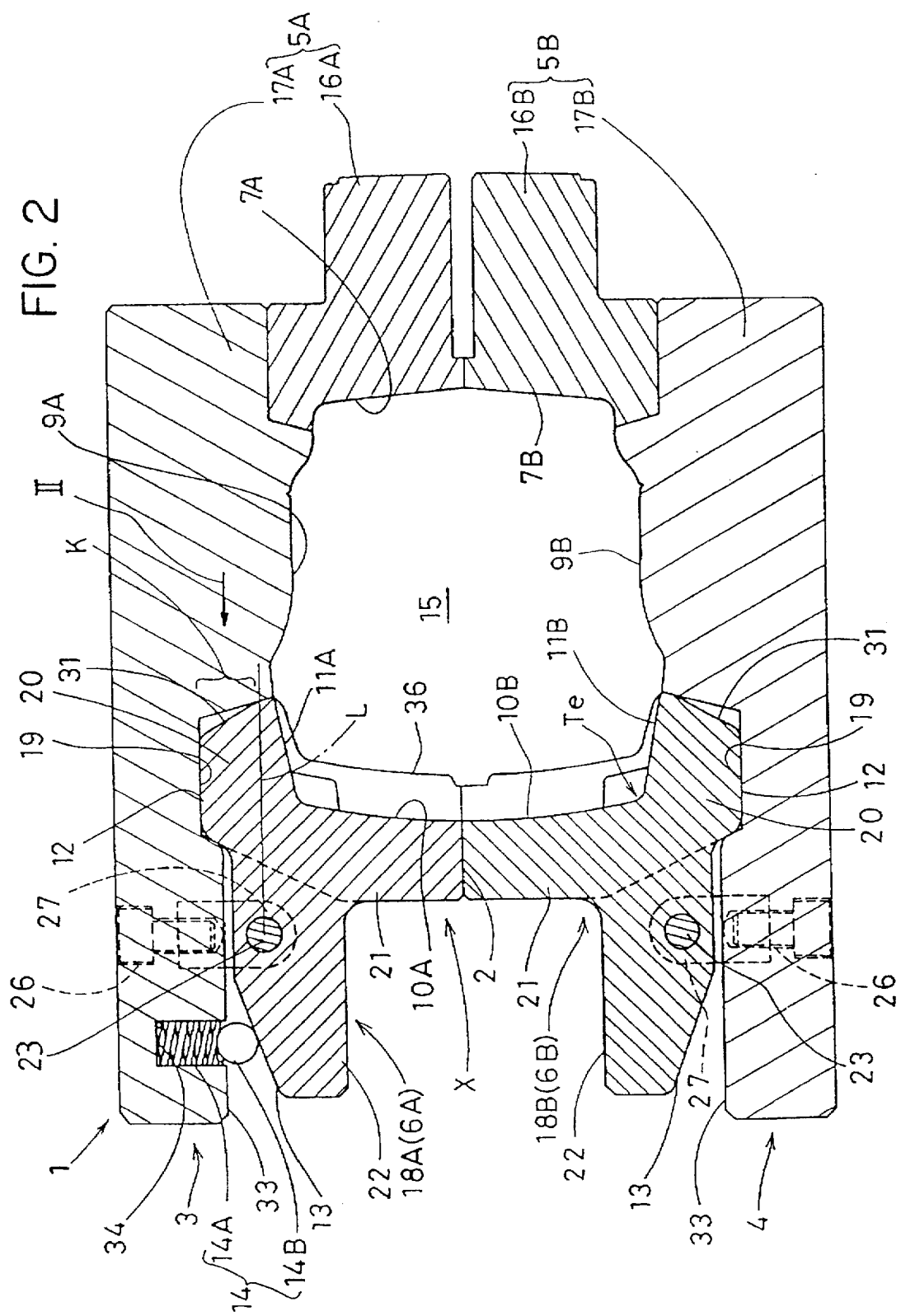
FIG. 2 is a sectional view showing an embodiment of the invention.
Figure 3:
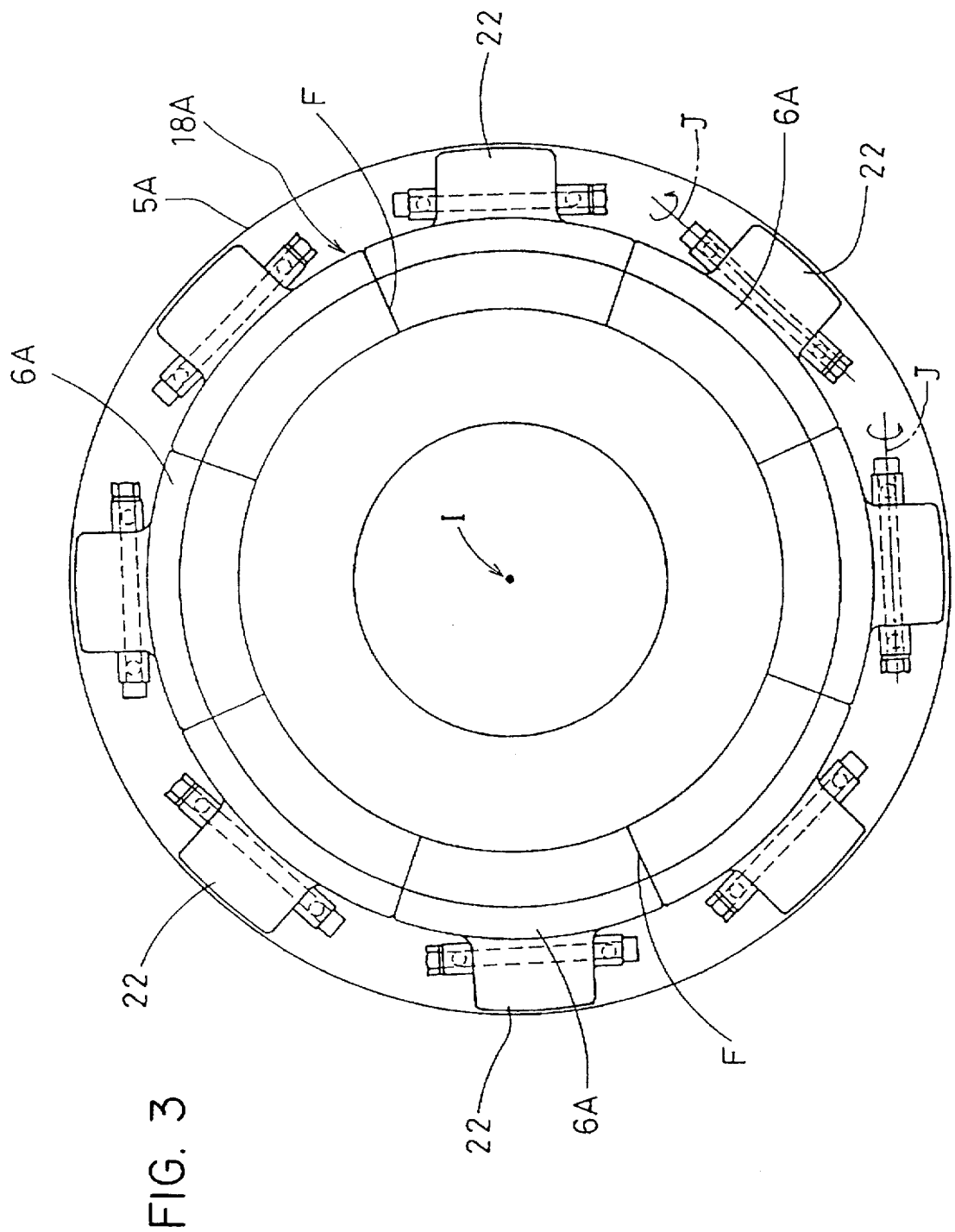
FIG. 3 is plan view along line I—I of FIG. 1 showing a upper mold without a clip ring.

The upper mold 3 has, as shown in FIGS. 2 and 3, a base part 5A and a tread ring part 18A. The base part 5A comprises a clip ring 16A having a bead molding surface 7A for an upper portion of a tire-bead SB (shown in FIG. 8), and a main body 17A having a sidewall molding surface 9A for an upper side of a tire-sidewall SS. The tread ring part 18A has a tread molding surface 10A for an upper portion of a tire-tread ST and a buttress molding surface 11A for an upper side of a tire-buttress SU, and is divided by radial split surfaces F extending from the tire axis I in the tire radial direction into a plurality of, or eight in this embodiment, tread segments 6A.

The lower mold 4 is approximately same in structure as the upper mold 3, and has a base part 5B comprising a clip ring 16B with a bead molding surface 7B and a main body 17B with a sidewall molding surface 9B, and a tread ring part 18B with a tread molding surface 10B and a buttress molding surface 11B. The tread ring part 18B is, also, divided into a plurality of tread segments 6B by the radial split surfaces F.

The tread molding surfaces 10A, 10B are provided with a rib portion 38 for forming a tire tread pattern of grooves.

Figure 4:
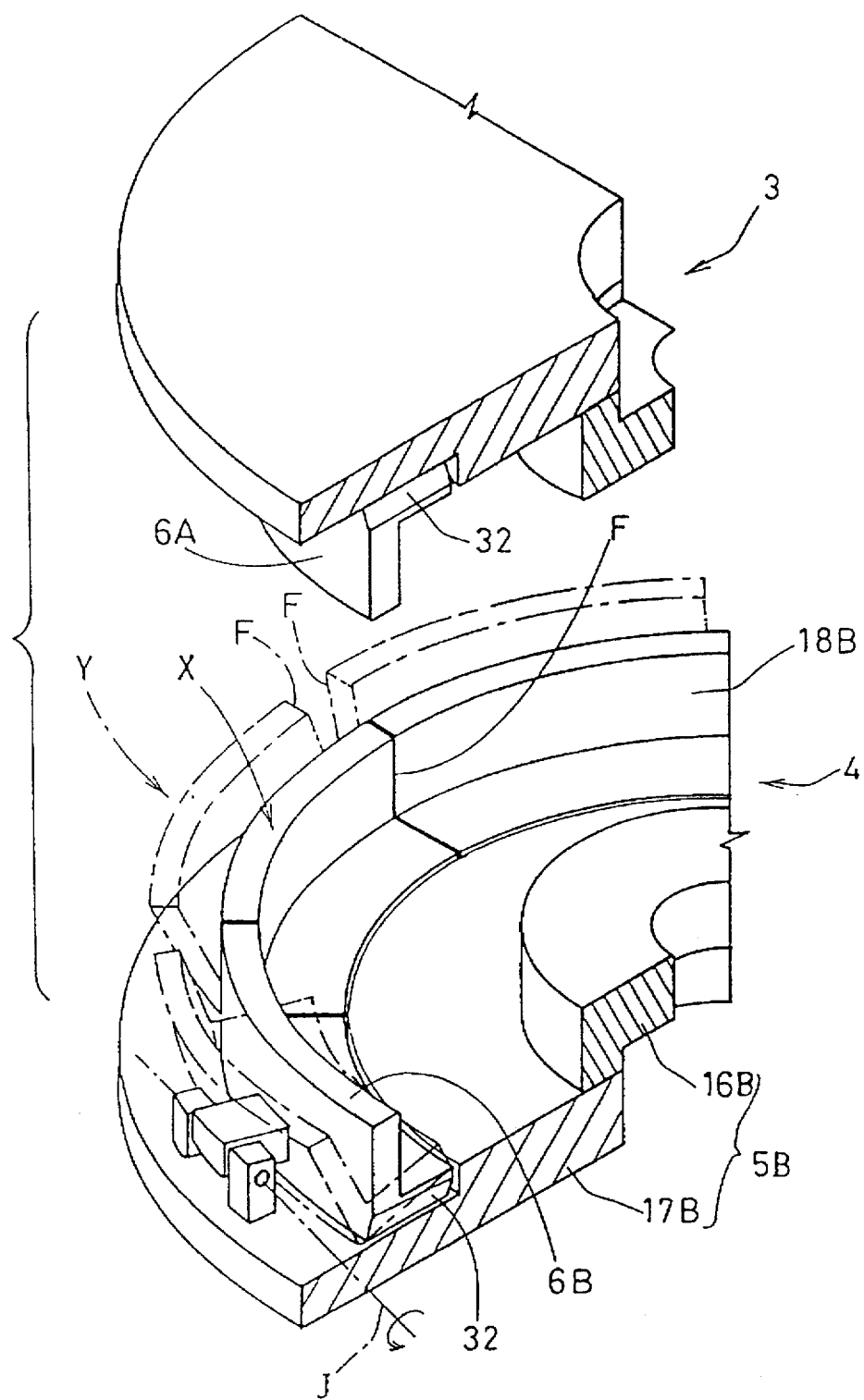
FIG. 4 is a schematic perspective view showing a movement of tread segments.

The tread segments 8A, 8B comprise a side portion 20 with a buttress molding surface 11A or 11B, a top portion 21 with a tread molding surface 10A or 10B, and a bulge portion 22 projecting from the top portion 21 in the tire radial direction, respectively. The bulge portion 22 is, as shown in FIGS. 3 and 4, pivotally supported on the base parts 5A, 5B around the center line J in the tangential direction of the circle centered on the tire axis I, so that the tread segments 8A, 8B are tiltable between the reference position X where the radial split surfaces F adjacent in the circumferential direction contact to each other and a releasing position Y where the radial split surfaces F are apart.

Figure 6:
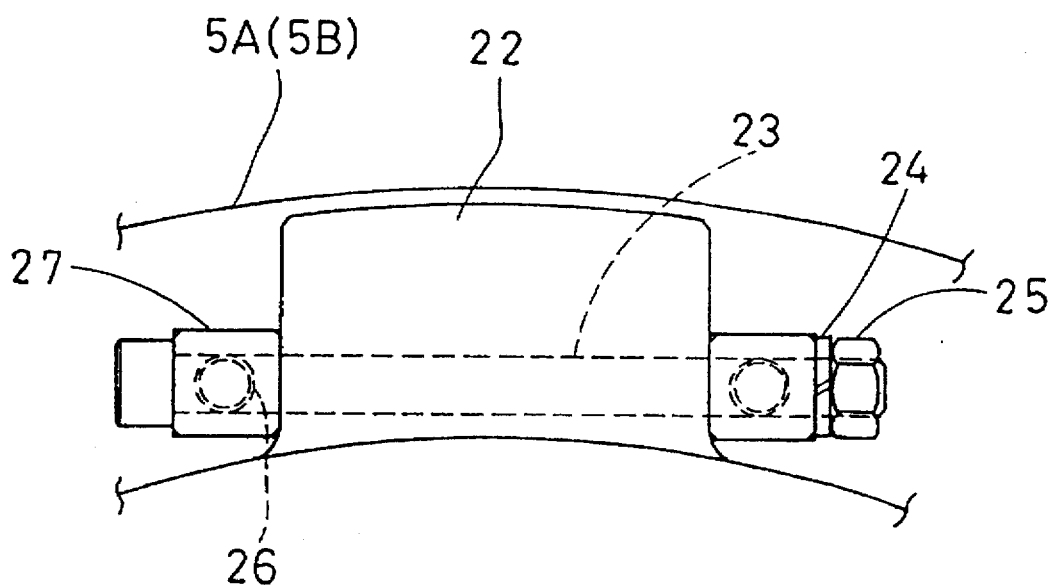
FIG. 6 is a partial plan view showing an example of a pivoting portion of the tread segment with a base part.

The bulge portion 22 is, as shown in FIG. 6, in this embodiment, fitted to the base parts 5A, 5B by a shaft 23 made of bolts which is fixed into bearings 27 with means of a spring washer and a nut 25. The bearings 27 are fixed by a embedded bolt 26 in the base parts 5A, 5B.

Figure 7:
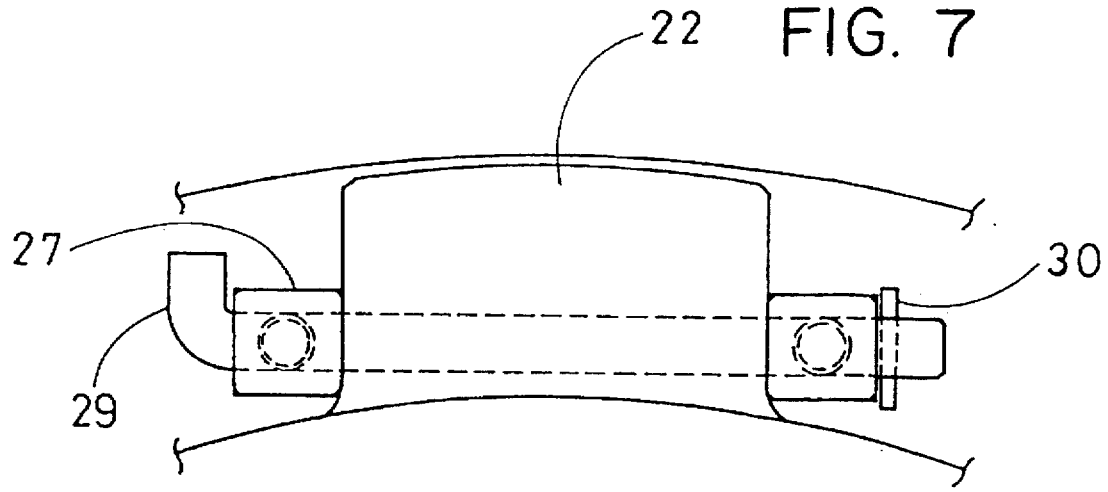
FIG. 7 is a partial plan view showing other embodiment of the pivoting portion of the tread segment.

As the fixing means of the tread segments 6A, 6B, as shown in FIG. 7, an iron bar 29 bent at one end may be driven through the bulge portion 22 and fitted to the bearing 27 by a pin 30 or the like.

Figure 8:
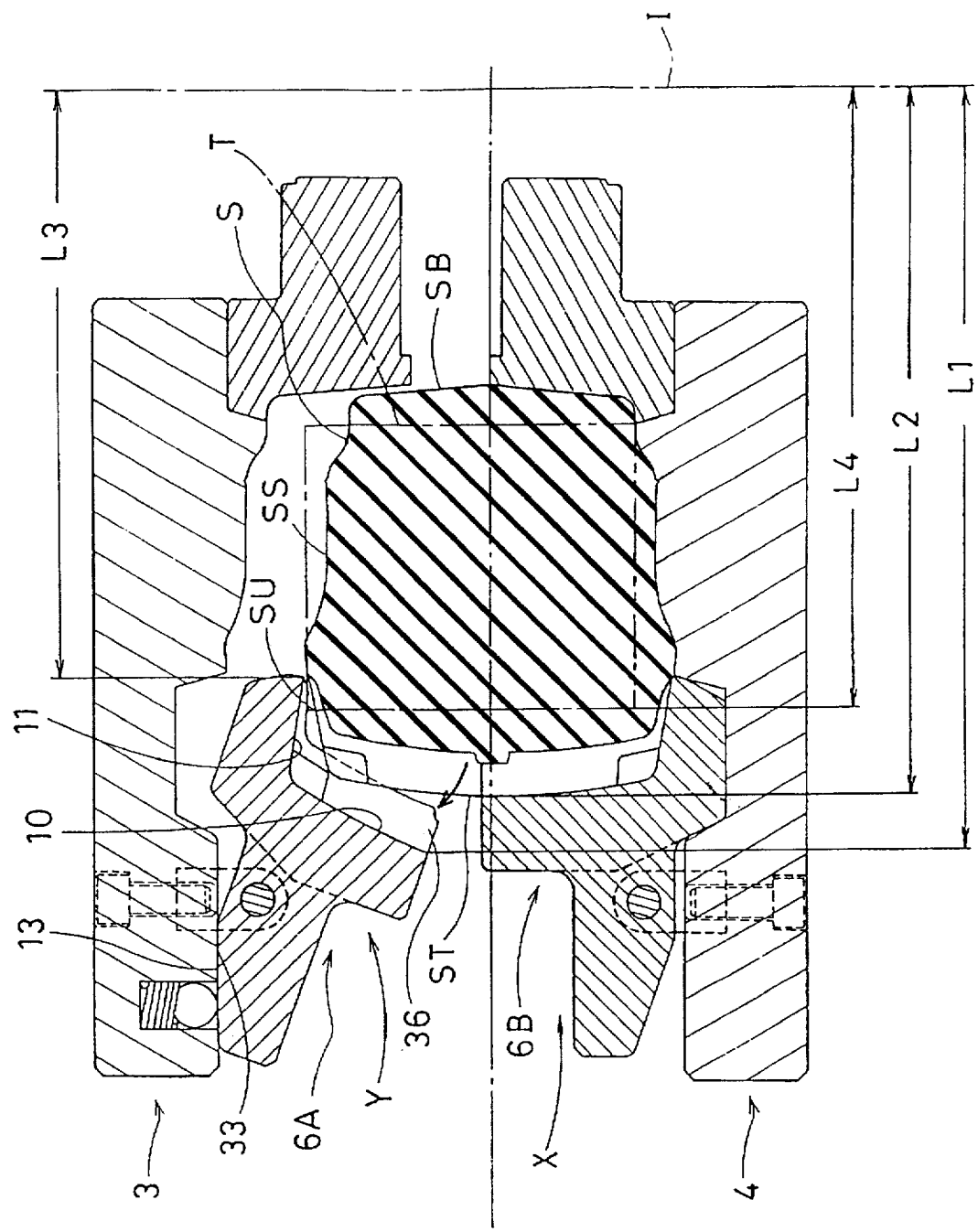
FIG. 8 is a sectional view showing the operation of the invention.

In the tread segments 6A, 8B, the center line J is positioned such that a radial distance L1 from the tire axis I to the tread molding surface 10 at the releasing position Y becomes larger than a radial distance L2 at the reference position X as shown in FIG. 8. In this embodiment, the center line J is positioned outwardly in the tire axial direction from an axially outer tread edge Te as shown in FIG. 2.

Figure 5:
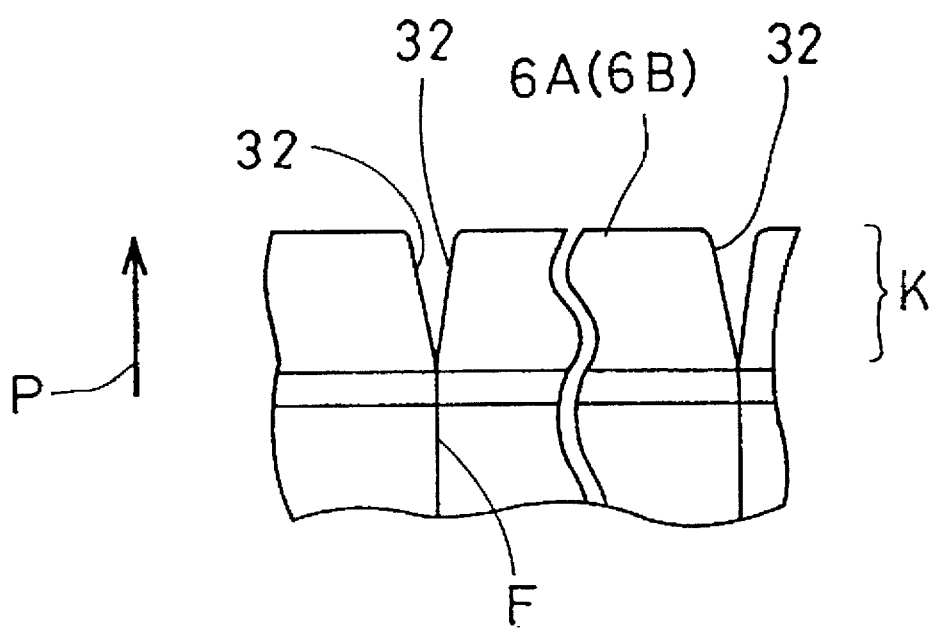
FIG. 5 is a partial side view taken in the direction of the arrow II of FIG. 2 showing an example of the tread segments.

The side portion 20 is provided with a stop surface 12 contacting a recess 19 of the base parts 5A, 5B at the reference position X, thereby setting the tread segments 8A, 8B at proper positions (reference position X). The side portion 20 is, also, provided with a slant 81 so as not to interfere with the base parts 5A, 5B when moving toward the releasing position Y. In addition, as shown in FIGS. 2, 4 and 5, the radial split surface F is provided with a slant 32 at an outside area K in the tire axial direction from a horizontal plane L passing through the center line J so that the tread segments adjacent in the circumferential direction may not interfere with each other when tilting toward the releasing position Y.

The bulge portion 22 is provided with a stop surface 13 contacting a horizontal plane 33 of the base parts 5A, 5B at the releasing position Y, and a radial distance L3 from the tire axis I to a radially inner end of the buttress molding surface 11 at the releasing position Y is set smaller than a radial distance L4 from the tire axis I to an outer surface of a green tire T as shown in FIG. 8. Thereby, the processing degree for the green tire is optimized, and the product quality is improved.

The tread segment 8A is thrust toward the reference position X by spring means 14 mounted on the base part 5A. In this embodiment, the spring means 14 comprise a coil spring 14A disposed in a recess 34 of the base body 5A and a sphere 14B fitted to the front end of the spring 14A to cope with the change of angle of the stop surface The operation of the mold is described below.

After inserting the green tire T into the opened space 15 of the mold 1 at the separate state V2, the upper mold 3 is lowered to press and squeeze the green tire T, thereby vulcanizing and forming into a finished tire S.

Then, as shown in FIG. 8, the upper mold 3 is lifted in order to take out the tire S. Along with the lifting of the upper mold 3, the tread segments 6A tilt automatically from the reference position X to the releasing position Y by a moment arising from a friction between a rib portion 36 and a tire rubber, thereby drawing out the rib portions 36 from the tire rubber approximately in the tire radial direction.

Figure 9:
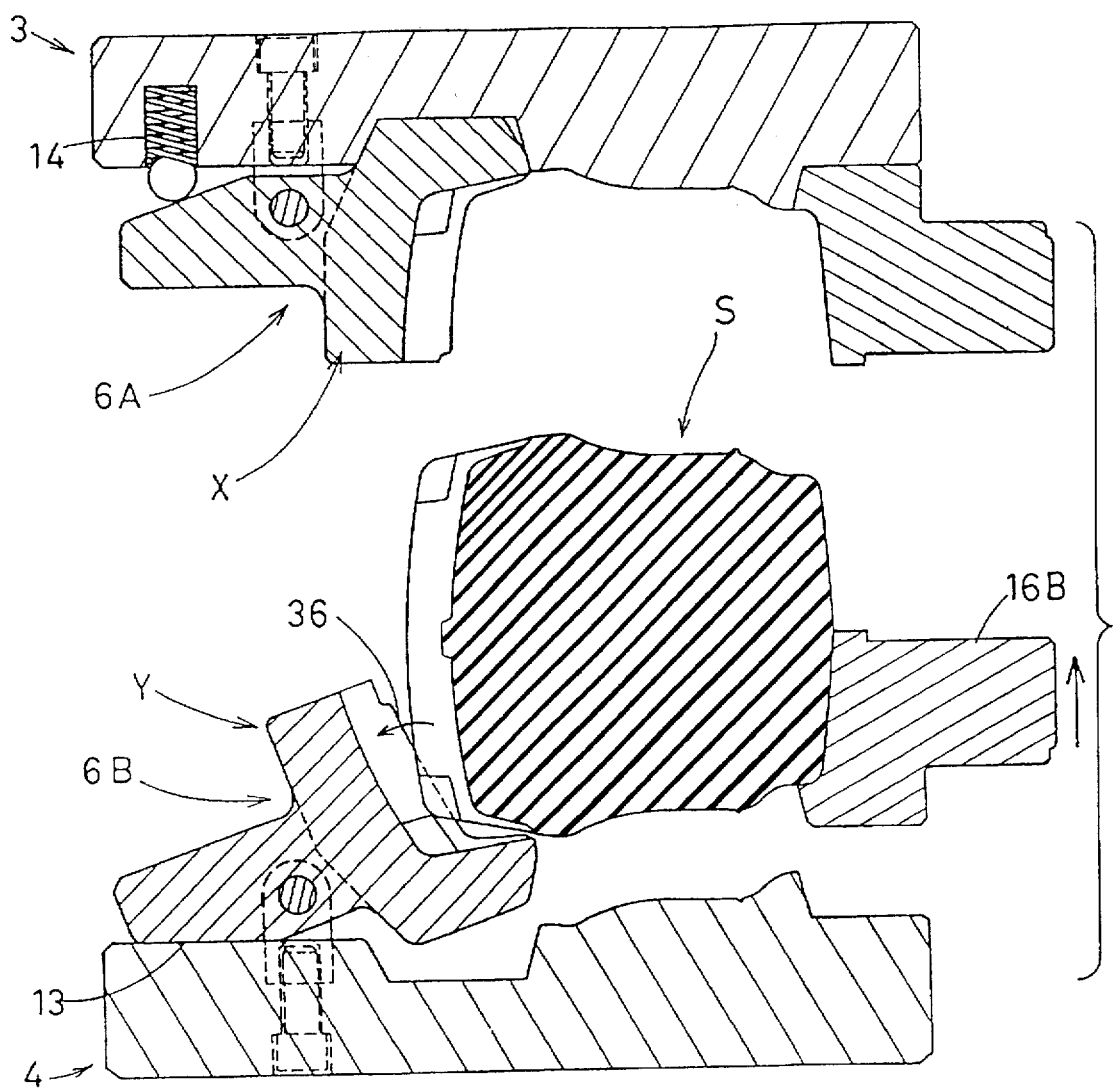
FIG. 9 is a sectional view showing the operation of the invention.

When the tread segments 6A are dislocated from the finished tire S, as shown in FIG. 9, the tread segments 6A are restored to the reference position X again by the spring means 14.

In consequence of lifting the tire S by the clip ring 16B, the tread segments 6B start tilting from the reference position X to the releasing position Y in the same way as the tread segments 6A, thereby drawing out the rib portions 36 from the tire rubber approximately in the tire radial direction.

Accordingly, the resistance between the mold 1 and the finished tire S is reduced, so that the finished tire S may be easily taken out of the mold 1 without chipping. In addition, since the rib portions 38 is drawn out approximately in the tire radial direction, it is possible to form the tread pattern including circumferential grooves.

When the finished tire S is dislocated from the tread segments 6B, the tread segments 6B return to the reference position X by its own gravity. As described above, since the upper and lower tread segments 6A, 6B are restored to the reference position X again, the gaps between the tread segments adjacent in the circumferential direction are closed before the green tire T is started pressing and squeezing by the molds 3, 4. Therefore, such the ooze of rubber from the gaps arising in the conventional split mold introduced in FIG. 12 is prevented. Moreover, since the complicated mechanism such as the split mold is not required, it is possible to manufacture easily, and cost for mold can be saved, the working mechanism can be simplified, and the controllability may be enhanced.

Figure 10:
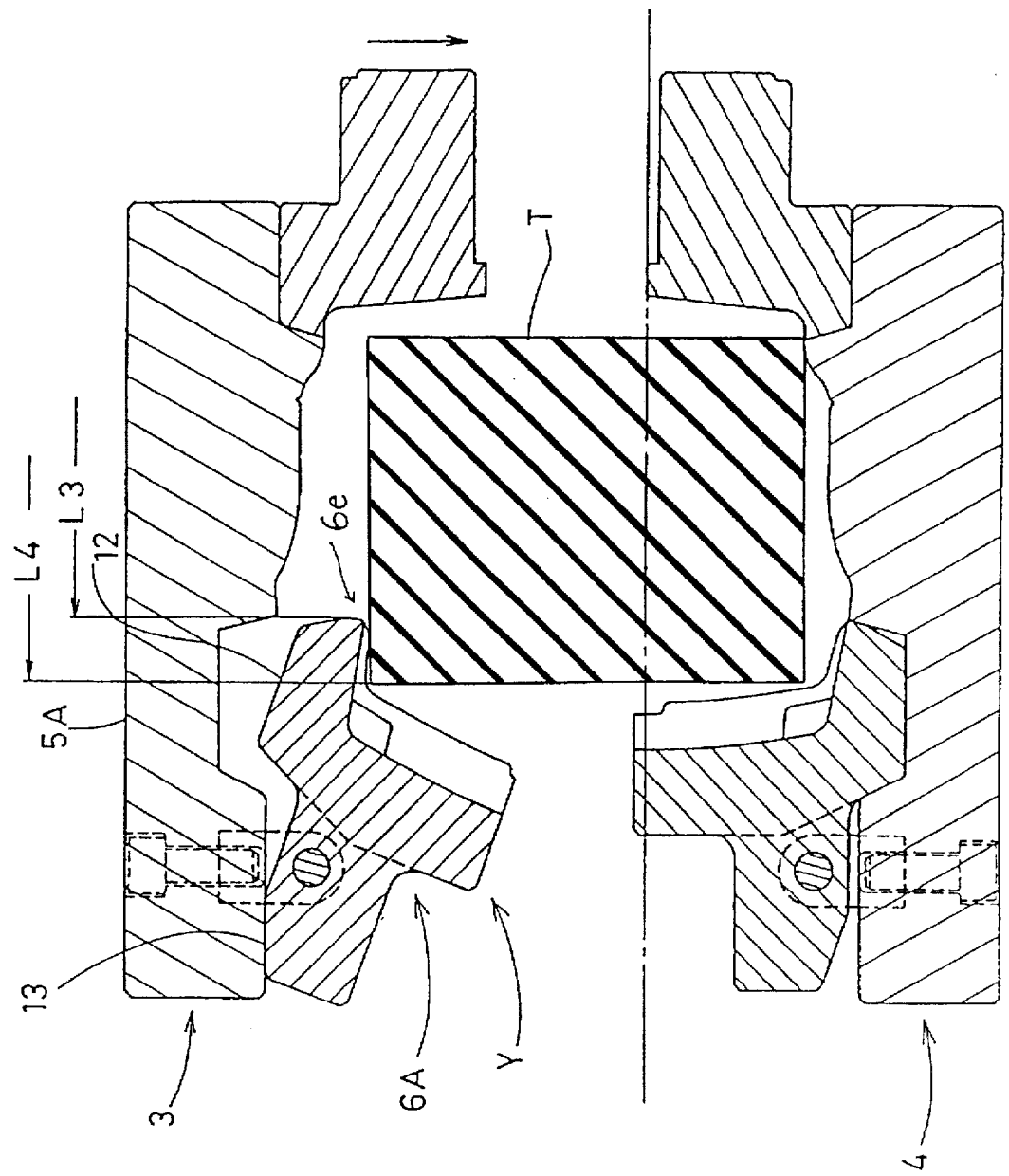
FIG. 10 is a sectional view showing other embodiment of the invention.

FIG. 10 shows other embodiment of the invention without the spring means 14.

In this embodiment, as the tread segments 6A descend, radially inner ends 6e of the segments 6A is pushed up by a side of the green tire T until the stop surface 12 abuts against the base part 5A so as to close the gaps between the tread segments. Therefore, the ooze of rubber from the gaps is prevented too. At this time, the angle of the stop surface 13 of the tread segment 6A must be set such that the radial distance L3 from the tire axis I to a radially inner end 6e of the buttress molding surface 11 at the releasing position Y is smaller than a radial distance L4 from the tire axis I to the outer surface of a green tire T.

The mold 1 of the invention may be used not only in the solid tire but also in an ordinary pneumatic tire. And the mold 1 may be also fabricated with the split surfaces 2 deviated from the tire equator. By deviating the split surfaces 2 upwardly, affixing of the vulcanized finished tire S to the upper mold 3 can be lessened.

What is claimed is:

1. A tire vulcanizing mold which is divided into an upper-mold and a lower-mold in the tire axial direction by a split surface, each of said upper-mold and the lower-mold comprising a base part having a bead molding surface for a tire-bead and a sidewall molding surface for a tire-sidewall, and a tread ring part having a tread molding surface for a tire-tread and a buttress molding surface for a tire-buttress, wherein said tread ring part is divided into a plurality of tread segments by radial split surfaces extending from the tire axis in the tire radial direction, each of said tread segments has a stop surface contacting with the base part at a reference position where the radial split surfaces of the tread ring part contact to each other, and is supported on the base part tiltably around a center line in the tangential direction of a circle centered on the tire axis between the reference position and a releasing position where the radial split surfaces are separated to each other, and a radial distance from the tire axis to the tread molding surface at the releasing position is larger than a radial distance from the tire axis to the tread molding surface at the reference position.

2. The tire vulcanizing mold of claim 1, wherein each of said tread segments provided at least in the upper mold is thrust toward the reference position by spring means.

3. The tire vulcanizing mold of claim 1, wherein each of said tread segments has a stop surface contacting with the base part at the releasing position, and a radial distance from the tire axis to the buttress molding surface at the releasing position is smaller than a radial distance from the tire axis to a radially outer surface of a green tire.

4. The tire vulcanizing mold of claim 2, wherein each of said tread segments has a stop surface contacting with the base part of the releasing position, and a radial distance from the tire axis to the buttress molding surface at the releasing position is smaller than a radial distance from the tire axis to a radially outer surface of a green tire.

* * * * *